(12) United States Patent
Ma et al.

(10) Patent No.: US 11,599,789 B2
(45) Date of Patent: Mar. 7, 2023

(54) HIERARCHICAL HIGHLY HETEROGENEOUS DISTRIBUTED SYSTEM BASED DEEP LEARNING APPLICATION OPTIMIZATION FRAMEWORK

(71) Applicant: SHANGHAI JIAO TONG UNIVERSITY, Shanghai (CN)

(72) Inventors: Ruhui Ma, Shanghai (CN); Zongpu Zhang, Shanghai (CN); Tao Song, Shanghai (CN); Yang Hua, Shanghai (CN); Haibing Guan, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 929 days.

(21) Appl. No.: 16/472,776

(22) PCT Filed: Aug. 2, 2018

(86) PCT No.: PCT/CN2018/098300
§ 371 (c)(1),
(2) Date: Jun. 21, 2019

(87) PCT Pub. No.: WO2020/024213
PCT Pub. Date: Feb. 6, 2020

(65) Prior Publication Data
US 2021/0350220 A1 Nov. 11, 2021

(51) Int. Cl.
*G06N 3/08* (2006.01)
*G06N 3/04* (2023.01)

(52) U.S. Cl.
CPC ............. *G06N 3/08* (2013.01); *G06N 3/0454* (2013.01)

(58) Field of Classification Search
CPC ................................ G06N 3/08; G06N 3/0454
See application file for complete search history.

(56) References Cited

U.S. PATENT DOCUMENTS 9,577,911 B1 * 2/2017 Castleman .............. H04L 67/10
2018/0129900 A1 5/2018 Kiraly
2019/0089645 A1 3/2019 Fu

FOREIGN PATENT DOCUMENTS

| CN | 105227488 A | 1/2016 |
|---|---|---|
| CN | 108021819 A | 5/2016 |
| CN | 107343000 A | 11/2017 |

OTHER PUBLICATIONS

Teerapittayanon, Surat, Bradley McDanel, and Hsiang-Tsung Kung. "Distributed deep neural networks over the cloud, the edge and end devices." 2017 IEEE 37th international conference on distributed computing systems (ICDCS). IEEE, 2017. (Year: 2017).*

(Continued)

*Primary Examiner* — Fayyaz Alam
(74) *Attorney, Agent, or Firm* — Fitch, Even, Tabin & Flannery LLP

(57) ABSTRACT

The present invention discloses a hierarchical highly heterogeneous distributed system based deep learning application optimization framework and relates to the field of deep learning in the direction of computational science. The hierarchical highly heterogeneous distributed system based deep learning application optimization framework comprises a running preparation stage and a running stage. The running preparation stage is used for performing deep neural network training. The running stage performs task assignment to all kinds of devices in the distributed system and uses a data encryption module to perform privacy protection to user sensitive data. Due to heterogeneous characteristics of a system task of the present invention, on the premise that the overall performance is guaranteed, the system response time is reduced, the user experience is guaranteed, the data encryption module based on the neural network can perform privacy protection to user sensitive data at a lower computing cost and storage cost, and the user data security is guaranteed.

8 Claims, 3 Drawing Sheets

(56) References Cited

OTHER PUBLICATIONS

Coninck, Elias DE et al.; "DIANNE: a modular framework for designing, training and deploying deep neural networks on heterogeneous distributed infrastructure"; Journal of Systems and Software; vol. 141; Jul. 2018; pp. 52-65.

Chen, Tianqi, et al., "Mxnet: A flexible and efficient machine learning library for heterogeneous distributed systems", arXiv:1512.01274, 2015.

Wright, Rebecca, and Zhiqiang Yang, "Privacy-preserving Bayesian network structure computation on distributed heterogeneous data" Proceedings of the tenth ACM SIGKDD international conference on Knowledge discovery and data mining. ACM, 2004.

PCT; App. No. PCT/CN2018/098300 International Search Report dated Apr. 28, 2019.

* cited by examiner

HIERARCHICAL HIGHLY HETEROGENEOUS DISTRIBUTED SYSTEM BASED DEEP LEARNING APPLICATION OPTIMIZATION FRAMEWORK

FIELD OF THE INVENTION

The present invention relates to the field of deep learning in the direction of computational science, and in particular to a hierarchical highly heterogeneous distributed system based deep learning application optimization framework.

DESCRIPTION OF THE PRIOR ART

Distributed systems are important computing platforms in the field of computer systems. As compared with the traditional centralized computation, the distributed system has the characteristics of high extendibility, high reliability and the like, and can efficiently realize system support for high-performance computation. The traditional distributed system is mounted on a high-performance computing server, and can efficiently utilize the computing resources thereof. With the development of mobile computing terminals, i.e. smartphones, and Internet of Things technology, extending the distributed system to mobile computing terminals and Internet-of-Things devices becomes a new opportunity for the development of distributed systems.

The hierarchical highly heterogeneous distributed system divides the computing nodes into three types: cloud nodes, fog nodes and terminal nodes according to the factors such as the performance of the computing device, network delay and power consumption limitation. The cloud node is developed from the traditional cloud computing framework, which is deployed on the high-performance computing center and has very strong and centralized computing capability resources. The fog node mainly refers to a stronger computing center on the path where data is uploaded by an end user to a cloud nod. A typical fog node is, for example, a home router in a smart home, a regional operator in a smart city, or the like. As compared with the cloud node, the fog node has limited computing capability resources, and has the advantages that its distance to the end user is closer. The terminal node covers the mobile computing terminal and the Internet of Things device, the former usually is a smartphone for example, and in particular refers to a modern smartphone with an intelligent computing chip, and the latter consists of a plurality of sensors, monitors and the like. The terminal node has weaker computing capability and typically has other physical resource limitations such as power consumption limitations, memory limitations and network resource limitations.

As such distributed systems are often used in user-oriented applications, network delay is an important factor that needs to be considered in such systems, which significantly affects the response time and user experience of the computing framework. Because the cloud node is far from the end user physically, the network communication is often unstable and has the disadvantage of high delay. As compared with the cloud node, the fog node is closer to the user and the network delay is smaller. The terminal node is closest to the user and has the advantage of very small network delay, but has a limitation of hardware resources.

In addition, privacy protection is also an important issue to be addressed by such systems. Conventional cloud computing-based artificial intelligence applications such as picture object recognition, typically require the user to upload the original picture to the cloud computing center of the service provider, but this increases the possibility of user privacy leakage, such as hijacking during data transmission and data leakage from the cloud computing center.

Therefore, one skilled in the art is committed to developing a depth learning application optimization framework based on a hierarchical highly heterogeneous distributed system, by which physical resources at each node and network resources between nodes in the system can be efficiently used, and privacy protection of user sensitive data can be realized at the same time and the user data security is guaranteed.

SUMMARY OF THE INVENTION

In view of the above-mentioned defects of the prior art, the technical problems to be solved by the present invention are how to more efficiently deploy deep learning applications to a hierarchical highly heterogeneous distributed system to efficiently use physical resources at each node and network resources between nodes in the system, and how to perform privacy protection to user sensitive data to guarantee the user data security.

In order to realize the above-mentioned purposes, the present invention provides a hierarchical highly heterogeneous distributed system based deep learning application optimization framework. The hierarchical highly heterogeneous distributed system based deep learning application optimization framework comprises a running preparation stage and a running stage. The running preparation stage is used for performing deep neural network training. The running stage performs task assignment to all kinds of devices in the distributed system and uses a data encryption module to perform privacy protection to user sensitive data.

Further, in the deep neural network training, deep neural network models having different emphases may be pertinently selected and designed.

Further, the selection of the deep neural network models depends on parameters comprising characteristics of each node in the current hierarchical highly heterogeneous distributed system, including computing ability, power consumption limitation, storage limitation, network state, support framework and the like.

Further, in the deep neural network training, a desired neural network is established based on computing nodes having enough computing ability after relevant parameters of the deep neural network are determined.

Further, each node of the deep neural network model may differ such as in network structure, number of network layers, whether to comprise a data regularization layer, whether to use a convolutional neural network, whether to use a speed-optimized deep neural network layer and the like.

Further, in the deep natural network training, a training termination condition is mainly referred to a numerical value of a model loss function, accuracy of a model in verification data sets, model training time and the like.

Further, the data encryption module uses a plurality of former layers of a neural network used in a high-hierarchy computing node (for example, as compared with a terminal node, a fog node is called as a high-hierarchy computing node) to perform forward transmission of sensitive data.

Further, at the running stage, according to a computing node of current task deployment obtained by a task scheduling algorithm based on computing time matching, encrypted data is sent to a designated node for computation.

Further, the task scheduling algorithm based on computing time matching computes an optimum matching quantity of terminal nodes and fog nodes according to task completion time of the terminal nodes and the fog nodes to assist in scheduling.

Further, at the running stage, different task results returned by a computing node are summarized according to system task heterogeneous characteristics, and the determination is mainly based on time consumptions when task results are returned, a task type of the computing node, performance of the computing node when the task type is executed and the like.

In one preferred embodiment of the present invention, by deploying a deep learning application on the hierarchical highly heterogeneous distributed system, heterogeneous characteristics of the distributed computing node are obtained, and the physical resources at each node and network resources between nodes can be efficiently used; and heterogeneous characteristics of the system task are obtained, and on the premise that the overall performance is guaranteed, the system response time is reduced and the user experience is improved.

In another preferred embodiment of the present invention, in the running process, when the terminal node used by the user initiates a computing task, whether current data is sensitive data is determined according to the input of the user, and if so, the data encryption module based on the neural network is used for performing privacy protection. Specifically, the module uses a plurality of former layers of a neural network used in a high-hierarchy computing node (for example, as compared with a terminal node, a fog node is called as a high-hierarchy computing node) to perform forward transmission of sensitive data. Then, the node only transmits a computing result to the high-hierarchy computing node, so as to prevent original sensitive data from being transmitted to other nodes and thereby to reduce the risk of privacy leakage.

As compared with the prior art, the present invention has the following beneficial effects:

(1) According to the present invention, on the premise that the overall performance is guaranteed, the system response time is reduced and the user experience is improved; and the task scheduling algorithm based on computing time matching can improve framework extendibility and performance.

(2) According to the present invention, the method of optimizing the deep neural network model according to the physical resources at each node in the distributed system has heterogeneous characteristics of a deep neural network, can balance computing overhead and model performance at each computing node and optimize the utilization rate of hardware resources.

(3) According to the present invention, the data encryption module based on the neural network can perform privacy protection to user sensitive data at a lower computing cost and storage cost; and the user data security is guaranteed.

The concept, specific structure and produced technical effects of the present invention will be further described below with reference to the drawings, so as to fully understand the purposes, features and effects of the present invention.

DETAILED DESCRIPTION OF THE PREFERRED EMBODIMENTS

Figure 1:
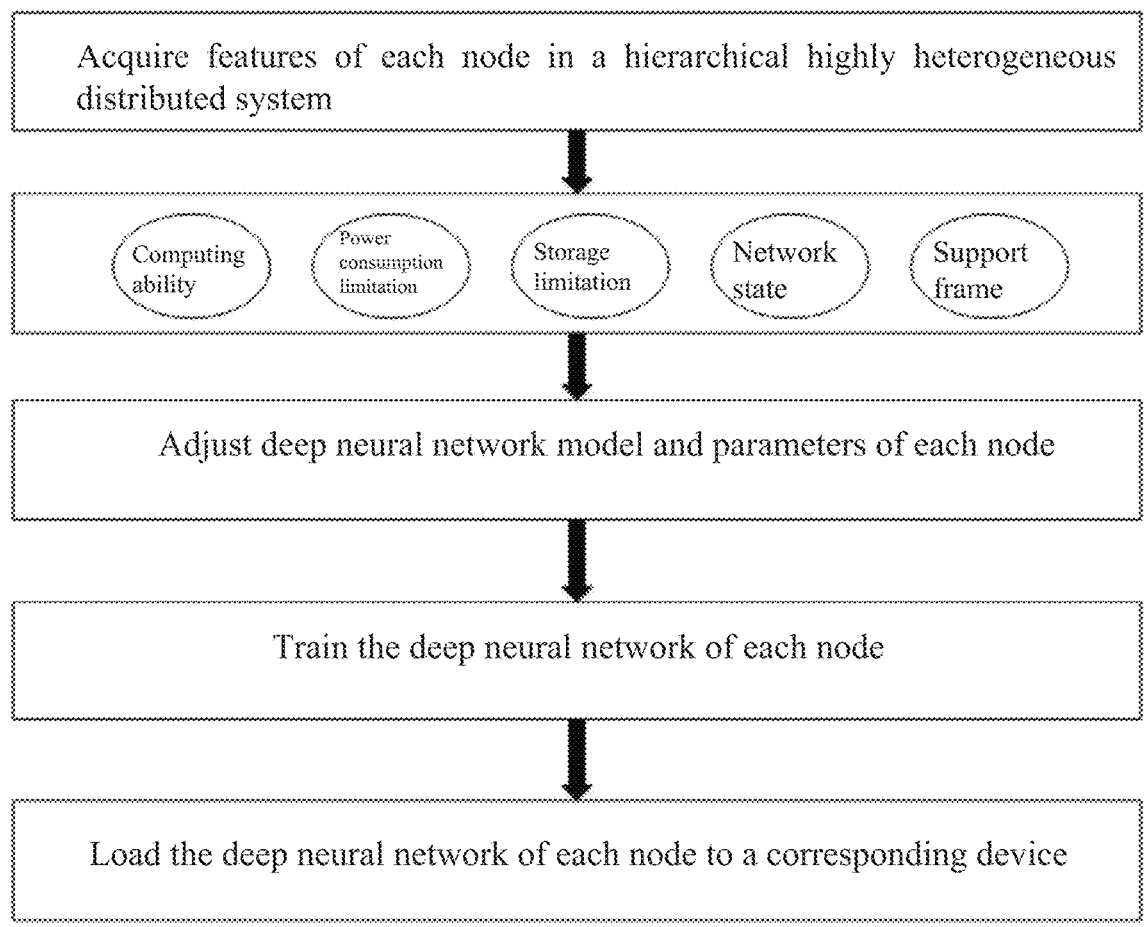
FIG. 1 is a schematic flow diagram of a running preparation stage in one preferred embodiment of the present invention.

Multiple preferred embodiments of the present invention will be introduced below with reference to the drawings of the description, such that the technical content thereof is clearer and easier to understand. The present invention may be embodied through many different forms of embodiments, and the protection scope of the present invention is not limited to the embodiments mentioned therein only.

In the drawings, components with the same structures are indicated by using the same numerical reference signs, and components with similar structures or functions throughout the drawings are indicated by using similar numerical reference signs. The size and thickness of each component illustrated in the drawings are randomly illustrated, and the size and thickness of each component are not limited in the present invention. In order to enable the illustration to be clearer, the thickness of components at some positions in the drawings is properly exaggerated.

As illustrated in FIG. 1, in a running preparation process, the framework needs to pertinently perform selection and training of a deep neural network according to the characteristics of each computing node. The characteristics of the computing node include but not limited to: computing ability, power consumption limitation, storage limitation, network state, support frame and the like. According to the relevant characteristics, adjustment to the deep neural network includes but not limited to: network structure, the number of network layers, whether to comprise a data regularization layer, whether to use a convolutional neural network, whether to use a speed-optimized deep neural network layer and the like.

The framework establishes a desired neural network on computing nodes (for example, a cloud node) having enough computing ability after relevant parameters of the deep neural network are determined, and then training is performed by using a training set. A training termination condition is mainly referred to, but not limited to, the following factors: a numerical value of a model loss function, an accuracy of a model in verification data sets, model training time and the like. After it is determined that the current neural network has completed training, a training node transmits a model file to a corresponding computing node.

Figure 2:
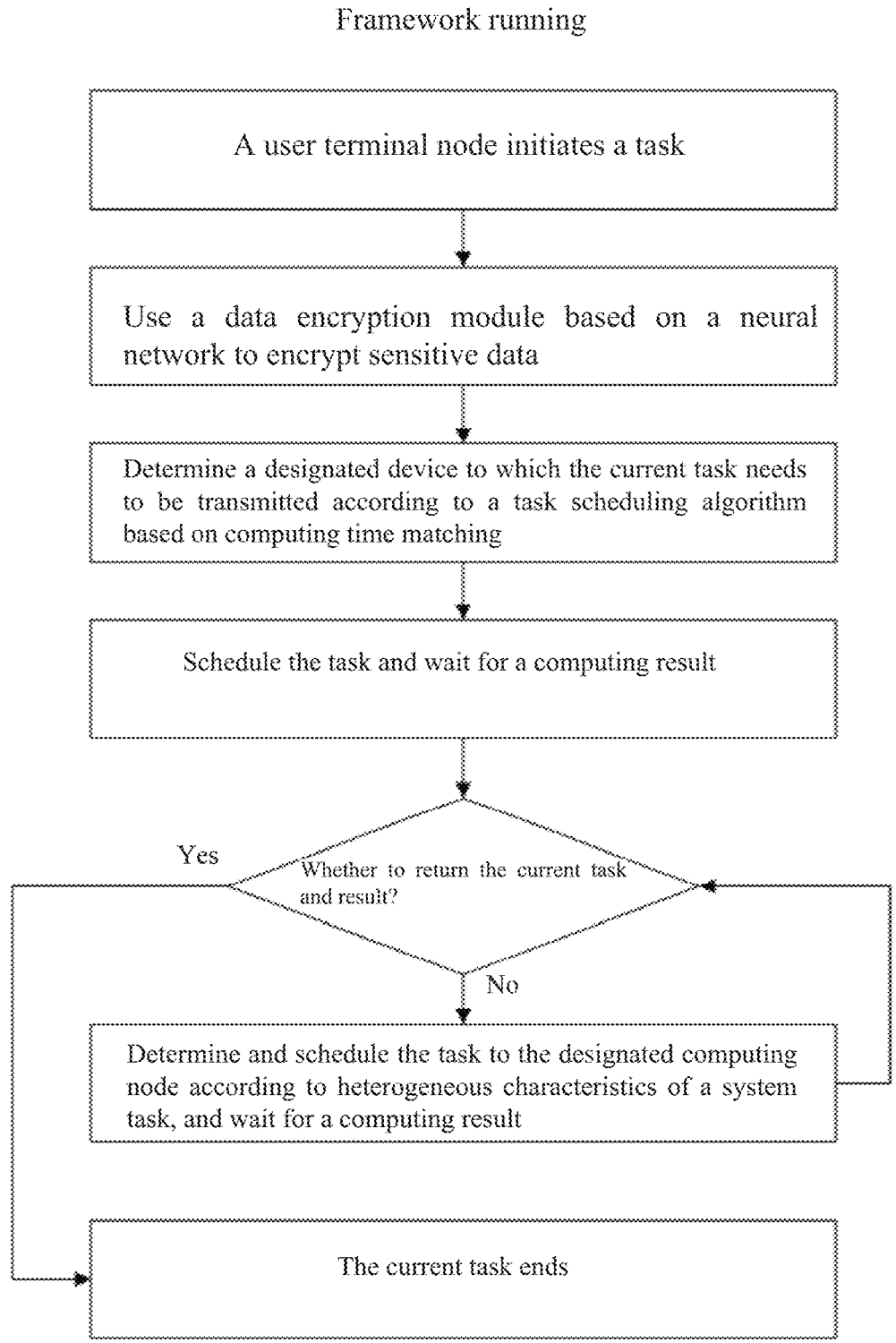
FIG. 2 illustrates a schematic flow diagram of a running stage in one preferred embodiment of the present invention.

As illustrated in FIG. 2, in a running process, when the terminal node used by the user initiates a computing task, firstly whether current data is sensitive data such as pictures is determined according to the input of the user. If so, a data encryption module based on the neural network is used to perform privacy protection. Specifically, the module uses a plurality of former layers of a neural network used in a high-hierarchy computing node (for example, as compared with a terminal node, a fog node is called as a high-hierarchy computing node) to perform forward transmission of the sensitive data. Then, the node only transmits a computing result to the high-hierarchy computing node, so as to prevent original sensitive data from being transmitted to other nodes and thereby to reduce the risk of privacy leakage.

Figure 3:
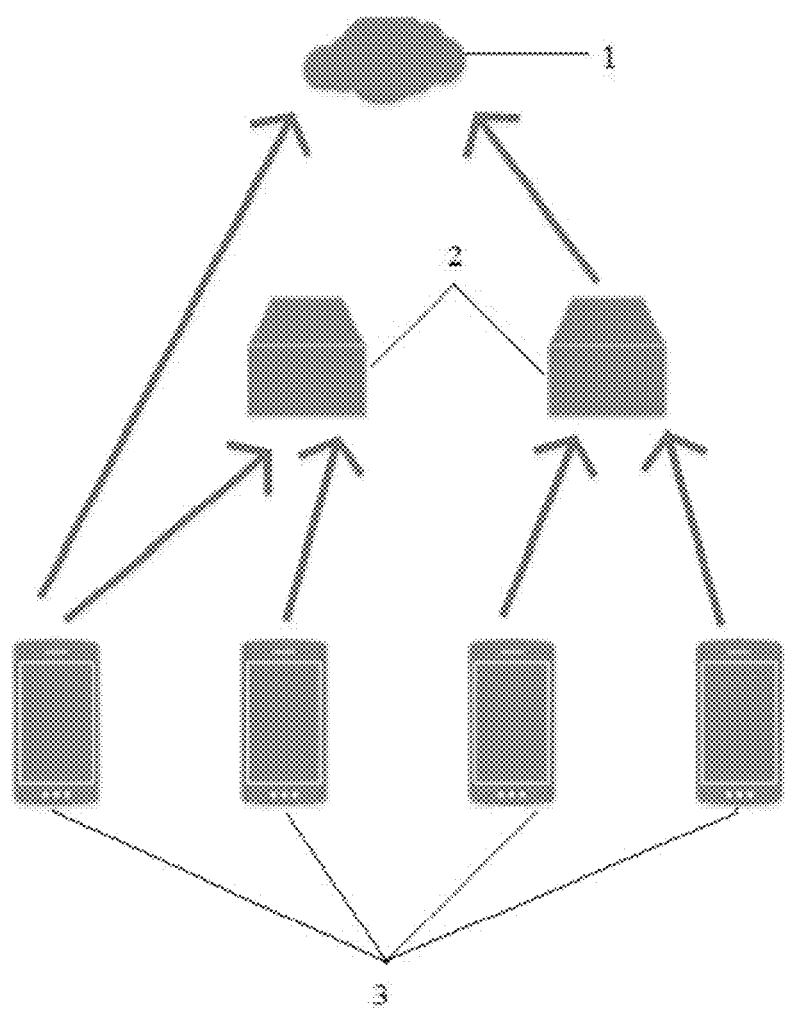
FIG. 3 illustrates a schematic diagram of a hierarchical highly heterogeneous distributed system in one preferred embodiment of the present invention, wherein, 1-cloud node, 2-fog node, 3-terminal node.

The encrypted data is then sent to a designated node according to a scheduling algorithm based on task time matching. As illustrated in FIG. 3, which illustrates a structure of a typical hierarchical highly heterogeneous distributed system, which mainly consists of three parts, i.e., terminal nodes 3, fog nodes 2 and a cloud node 1. Herein, a scheduling mode in which a data stream is directly sent to the cloud node 1 from the terminal node is called as a terminal-cloud mode. Similarly, a scheduling mode in which the data stream is sent to the fog node 2 from the terminal node is called as a terminal-fog mode, and a scheduling mode in which the data stream is sent from the fog node 2 to the cloud node 1 is called as a fog-cloud mode. The above-mentioned three scheduling modes have defects to different extents, e.g., in the terminal-cloud mode, network communication from each terminal to the cloud node is congested and highly delayed, in the terminal-fog mode, the neural network performance of the fog node is limited, and in the fog-cloud mode, communication of task transmission between the terminal node and the fog node is delayed, etc.

The scheduling algorithm based on task time matching provided by the present invention can effectively balance network delay and system performance. The algorithm computes an optimum matching quantity of the terminal nodes and the fog nodes according to task completion time of the terminal nodes and the fog nodes to assist in scheduling. Specifically, supposing that total computation time of the terminal nodes and the fog nodes (including forward transmission time and communication delay time consumption of the neural network model) is respectively:

$$t_{end}^p + t_{end}^c, t_{edge}^p + t_{edge}^c$$

Then the optimum matching quantity may be calculated according to the following formula:

$$N_{map} = \left\lceil \frac{t_{edge}^c + t_{edge}^p}{t_{end}^c + t_{end}^p} \right\rceil$$

According to heterogeneous characteristics of the system task, the computing result of each node is determined and returned to the user terminal node. The determination is mainly based on time consumption produced when task results are returned, a task type of the computing node, performance of the computing node when the task type is executed and the like. Determination modes include but not limited to: returning the highest-performance simple task type to the user at the smallest delay, returning once the highest-performance complex task type to the user and the like.

The preferred specific embodiments of the present invention have already been described above in detail. It shall be understood that one skilled in the art may make various modifications and variations according to the concept of the present invention without contributing any inventive labor. Therefore, technical solutions that can be obtained by one skilled in the art through logical analysis, reasoning or limited experiments according to the concept of the present invention based on the prior art shall be all included in the protection scope defined by the claims.

The invention claimed is:

1. A hierarchical highly heterogeneous distributed system based deep learning application optimization framework, comprising a running preparation stage and a running stage, wherein the running preparation stage is used for performing deep neural network training, and the running stage performs task assignment to all kinds of devices in a distributed system and uses a data encryption module to perform privacy protection to user sensitive data;

wherein the data encryption module is configured that when recognizing a current data is the sensitive data, the data encryption module uses a plurality of former layers of a neural network used in a high-hierarchy computing node to perform forward transmission of the sensitive data; and wherein, at the running stage, according to a computing node of current task deployment obtained by a task scheduling algorithm based on computing time matching, encrypted data is sent to a designated node for computation, then only a computing result is transmitted to the high-hierarchy computing node, such that original sensitive data is prevented from being transmitted to other nodes.

2. The hierarchical highly heterogeneous distributed system based deep learning application optimization framework according to claim 1, wherein, in the deep neural network training, deep neural network models having different emphases can be pertinently selected and designed.

3. The hierarchical highly heterogeneous distributed system based deep learning application optimization framework according to claim 2, wherein a selection of the deep neural network models depends on parameters comprising characteristics of each node in the current hierarchical highly heterogeneous distributed system, including computing ability, power consumption limitation, storage limitation, network state, and support framework.

4. The hierarchical highly heterogeneous distributed system based deep learning application optimization framework according to claim 1, wherein, in the deep neural network training, a desired neural network is established on computing nodes having enough computing ability after relevant parameters of the deep neural network are determined.

5. The hierarchical highly heterogeneous distributed system based deep learning application optimization framework according to claim 2, wherein each node of the deep neural network models can differ in network structure, a number of network layers, whether to comprise a data regularization layer, whether to use a convolutional neural network, and whether to use a speed-optimized deep neural network layer.

6. The hierarchical highly heterogeneous distributed system based deep learning application optimization framework according to claim 1, wherein in the deep natural network training, a training termination condition is referred to a numerical value of a model loss function, an accuracy of a model in a verification data sets, and model training time.

7. The hierarchical highly heterogeneous distributed system based deep learning application optimization framework according to claim 1, wherein the task scheduling algorithm based on computing time matching computes an optimum matching quantity of terminal nodes and fog nodes according to task completion time of the terminal nodes and the fog nodes to assist in scheduling.

8. The hierarchical highly heterogeneous distributed system based deep learning application optimization framework according to claim 1, wherein, at the running stage, different task results returned by a computing node are summarized according to heterogeneous characteristics of a system task, which is mainly based on time consumption produced when the task results are returned, a task type of the computing node, and performance of the computing node when the task type is executed.

\* \* \* \* \*